United States Patent
Proudfoot et al.

(10) Patent No.: US 7,639,406 B1
(45) Date of Patent: Dec. 29, 2009

(54) MOVABLE DOCUMENT CRADLE FOR FACILITATING IMAGING OF BOUND DOCUMENTS

(75) Inventors: R. Alexander Proudfoot, Santa Clara, CA (US); Christopher R. Uhlik, Danville, CA (US); Joseph K. O'Sullivan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 755 days.

(21) Appl. No.: 10/611,408

(22) Filed: Jun. 30, 2003

(51) Int. Cl.
*H04N 1/04* (2006.01)

(52) U.S. Cl. .............. 358/474; 358/498; 358/488; 358/464

(58) Field of Classification Search ............ 358/474, 358/498, 488, 464, 493, 494, 497; 382/199
See application file for complete search history.

(56) References Cited

U.S. PATENT DOCUMENTS

| | | | |
|---|---|---|---|
| 2,406,152 A | 8/1946 | Levine | |
| 4,356,390 A | 10/1982 | Feilchenfeld | |
| 5,185,821 A | 2/1993 | Yoda | |
| 5,636,006 A | 6/1997 | Wu | |
| 5,640,252 A * | 6/1997 | Turner et al. | 358/497 |
| 5,777,660 A | 7/1998 | Ard | |
| 5,835,241 A | 11/1998 | Saund | |
| 5,886,342 A * | 3/1999 | Matsui | 250/208.1 |
| 6,124,950 A * | 9/2000 | Honda | 358/474 |
| 6,491,278 B1 | 12/2002 | Thomsen | |
| 6,493,469 B1 | 12/2002 | Taylor | |
| 6,762,862 B2 | 7/2004 | Lam et al. | |
| 7,113,619 B1 | 9/2006 | Matama | |
| 7,224,472 B2 | 5/2007 | Bauch et al. | |
| 2003/0086721 A1 | 5/2003 | Guillemin et al. | |
| 2004/0047009 A1 * | 3/2004 | Taylor et al. | 358/498 |

OTHER PUBLICATIONS

Transaction History from Pair printed Mar. 26, 2009, for U.S. Appl. No. 10/611,681.
Transaction History from Pair printed Mar. 26, 2009, for U.S. Appl. No. 10/611,666.
Transaction History from Pair printed Mar. 26, 2009, for U.S. Appl. No. 10/713,662.

* cited by examiner

*Primary Examiner*—Houshang Safaipour
(74) *Attorney, Agent, or Firm*—Fish & Richardson P.C.

(57) ABSTRACT

Systems and methods for moving a document cradle to facilitate imaging of a bound document are disclosed. The system may include a cradle supporting a document, such as a book, a cradle positioner for selectively positioning the cradle relative to a camera, and a controller for controlling the positioner to automatically position the cradle based on the location of the page being imaged relative to the camera. The cradle may be positioned such that a gutter of the book or a surface plane of each page being imaged remains in approximately the same position relative to the camera. The cradle positioner may include a servo motor controlling a shaft to position the cradle supported and guided by a bearing. A sensor (e.g., 3D camera, range finder, laser, and/or edge detector) may be provided to facilitate the controller in controlling the cradle positioner based on the location of the page being imaged relative to the camera. The controller may control the positioner based on, for example, current page count tracked by the controller, total number of pages, thickness of the book, width of the gutter of the cradle, and/or weight of the book exerted on one or both sides of the cradle.

38 Claims, 6 Drawing Sheets

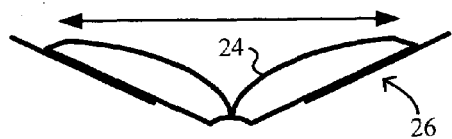
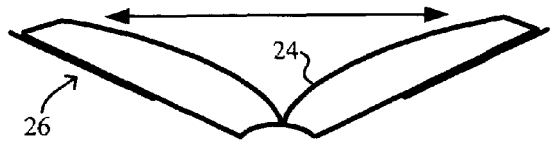
FIG. 3A   FIG. 3B
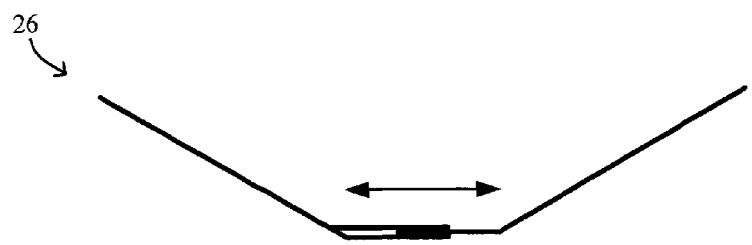
FIG. 3C
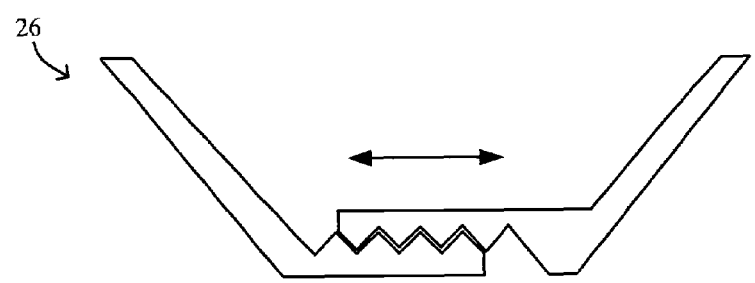
FIG. 3D
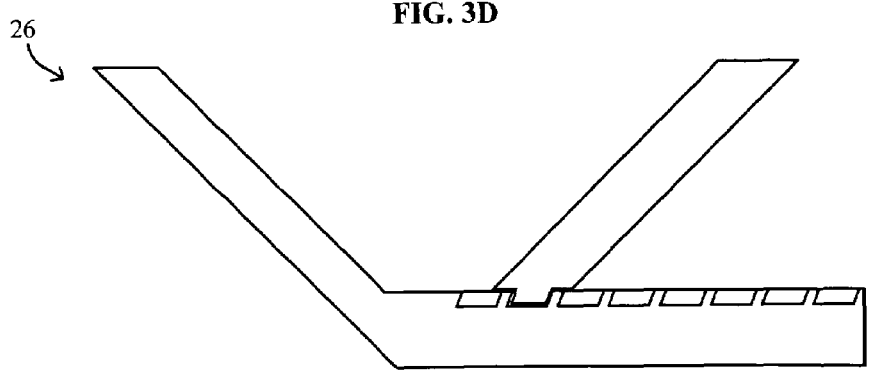
FIG. 3E

MOVABLE DOCUMENT CRADLE FOR FACILITATING IMAGING OF BOUND DOCUMENTS

CROSS REFERENCE TO RELATED APPLICATIONS

This application is related to co-pending U.S. patent application Ser. No. 10/611,681 entitled "Pacing and Error Monitoring of Manual Page Turning Operator" and U.S. patent application Ser. No. 10/611,666 entitled "Acquiring and Using Three-Dimensional Information in a Document Scanning System", filed concurrently herewith, which are incorporated by reference in their entireties.

BACKGROUND OF THE INVENTION

1. Field of the Invention

The present invention relates generally to the scanning of printed material. More specifically, systems and methods for moving a document cradle to facilitate imaging of a bound document are disclosed.

2. Description of Related Art

Scanning books, magazines, and other printed material into digital form has become more common with the advent of improved imaging, storage and distribution techniques. Although unbound printed material can generally be scanned with relative ease using automatic page-feeding mechanisms such as those commonly found on digital copiers and scanners, bound documents present additional challenges. Bound documents include not only books, but also periodicals, manuscripts, pamphlets, brochures, newspapers, manuals, and any other document having a bound edge. Many institutions, such as the Library of Congress, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding region of the bound documents to insure that they come within the scanner's depth of focus. Such force can damage the spine region of the document. In addition, using the flat-bed platen can be tedious and time-consuming, as the bound documents typically must be lifted and repositioned after each page is scanned. Further, image quality is often poor due to loss of focus, uneven illumination, and distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners make use of automatic page turning apparatuses. In addition, optics and software have been developed for compensating for the image-distortion resulting from the inherently curved surfaces typical of open, edge-bound books that are not subjected to potentially damaging flattening pressure. For example, the curvature of a document's pages may be detected using a curvature detector, with a linear light source for defining a brightness distribution. The detected curves of the page can then be used to approximately rectify image signals received from the document scanner.

However, the pages of the bound document may become out of focus and/or out of alignment during the course of the scanning. Thus, it would be desirable to provide a simple, efficient, and cost-effective system for capturing images of the pages of a bound document while maintaining focus, uniform lighting, and/or alignment within the image frame of the camera.

SUMMARY OF THE INVENTION

Systems and methods for moving a document cradle to facilitate imaging of a bound document are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments are described below.

In one preferred embodiment, the system includes a cradle supporting a document (e.g., a book), a cradle-positioning mechanism, and a controller for controlling the cradle-positioning mechanism to automatically and selectively position the cradle based on the location of the page being imaged relative to the camera. The cradle may be positioned such that either a spine of the book or a surface plane of each page being imaged remains in approximately the same position relative to the camera throughout the entire book. The cradle positioning mechanism may include a servo motor controlling a shaft to position the cradle supported and guided by a bearing. A sensor, e.g., 3D camera, range finder, laser, and edge detector, may be provided to facilitate the controller in controlling the cradle positioning mechanism based on the location of the page being imaged relative to the camera. The controller may control the positioning mechanism based on, for example, current page count tracked by the controller, total number of pages, thickness of the book, width of the gutter of the cradle, and/or weight of the book exerted on one or both sides of the cradle.

The cradle may be a flat platform or may be angled. The angled cradle may provide a gutter that is adjustable in width by adjusting the relative positions of two angled sides supporting the sides of the open book. The cradle preferably supports the book such that the opening angle of the book is between approximately 100° and 135° and may be tilted up and angled toward the operator approximately 10°. The cradle may have a pattern on a surface of the cradle facing the camera to facilitate discerning areas over-scanned by the camera.

The imaging system may also include a document securing mechanism for securing the document to the cradle. For example, a clip, clamp, magnetic plate for insertion inside a front and/or back cover of the document may be provided.

When a magnetic plate is provided, the cradle is such that the magnetic plate is attracted to the cradle to facilitate securing the document to the cradle.

According to another embodiment, a method for imaging a bound document having multiple pages generally includes supporting the bound document in a cradle, capturing images of the pages of the bound document with a camera, automatically and selectively positioning the cradle relative to the camera using a cradle positioning mechanism controlled by a controller based on the location of the page being imaged relative to the camera.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

FIGS. 3A-3E are schematic diagrams illustrating various cradle width adjustment mechanisms that may be used in the image capturing system of FIG. 1A.

DESCRIPTION OF SPECIFIC EMBODIMENTS

Systems and methods for moving a document cradle to facilitate imaging of a bound document are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1A:
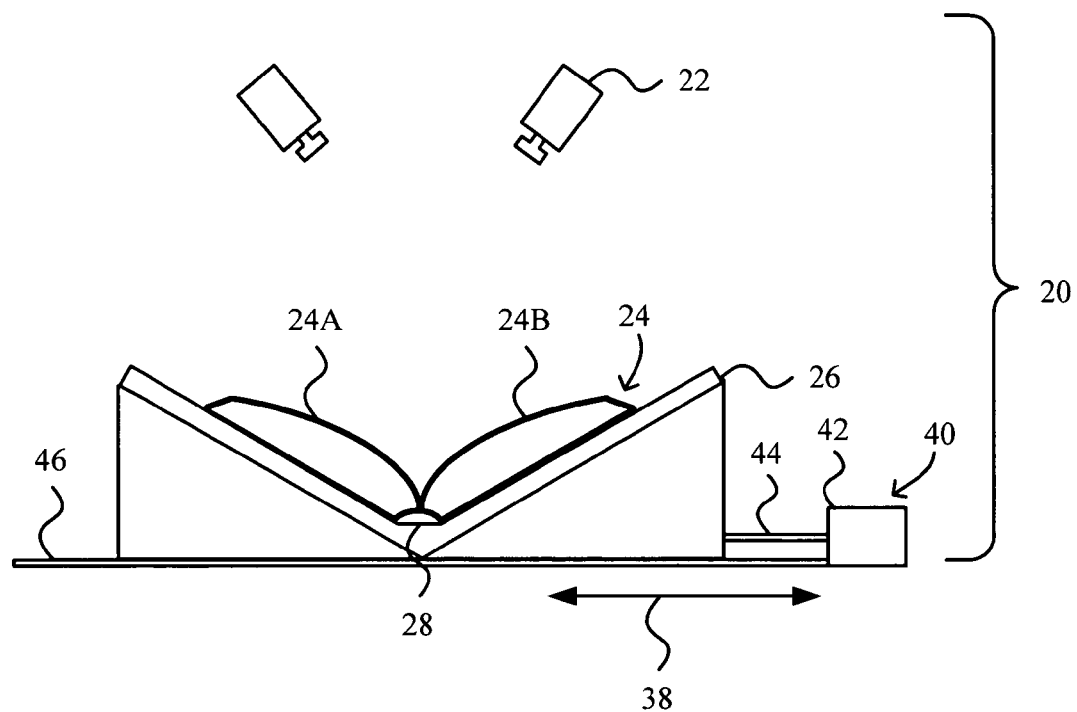
FIG. 1A is a schematic diagram of an exemplary image capturing system having a movable cradle to selectively position a book relative to a camera.
Figure 1B:
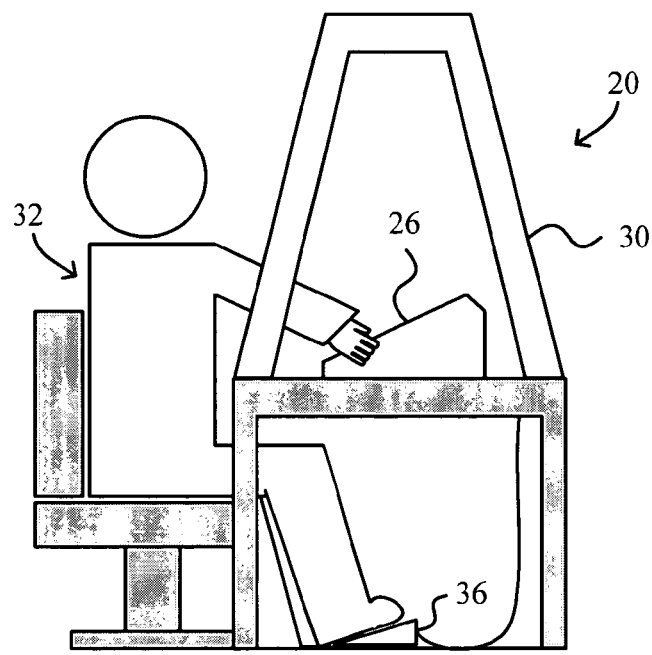
FIG. 1B is a schematic diagram illustrating an operator at the image capturing system of FIG. 1A.

FIG. 1A is a schematic diagram of one exemplary embodiment of an image capturing system 20 and FIG. 1B is a schematic diagram illustrating an operator 32 at the image capturing system 20. The image capturing system 20 generally includes one or more cameras 22, such as two high resolution cameras each for imaging or photographing a corresponding facing page 24A, 24B of an open bound document, such as a book 24, resting in a support such as an angled cradle 26. The cradle 26 may provide a generally flat gutter 28 on which the binding of the book 24 rests. It is to be understood that although a book is used herein in describing the imaging system and process, the system and process may be utilized to and/or adapted to image any other suitable type of bound documents such as periodicals, manuscripts, pamphlets, brochures, newspapers, manuals and/or any other types of documents having a bound edge, typically with a hard or soft cover. In addition, although the cameras 22 are shown as an exemplary image capturing mechanism for the image capturing system 20, any other image capturing mechanism such as a camera in combination with moving mirrors may be employed. The system 20 may include a housing 30 or other structure to house or otherwise support the cameras 22, lighting mechanism, and/or other components of the image capturing system 20. A foot pedal 36 may be provided so that the operator 32 may depress the foot pedal 36 to trigger the cameras 22. The image capturing system 20 preferably also includes a cradle positioning mechanism 40 that can selectively position the cradle 26 along the left-right direction as indicated by arrow 38 relative to the stationary cameras 22.

If the cameras 22 and the cradle 26 remain stationary relative to each other as the pages of the book 24 are turned, the surface plane of each page being imaged is shifted slightly in position relative to the surface plane of the previous page. This shift in the page surface plane position occurs because the pages from the right side of the book 24 are turned and positioned onto the left side of the book 24. With each page turning, the right side of the book 24 becomes thinner and the left side of the book 24 becomes thicker as a result of the cumulative thickness of the pages being turned from right to left. In addition to the shift in the surface plane of the pages being images, as the pages of the book are turned, the gutter of the book between the two facing pages also shifts in position relative to the cameras.

For thinner books, the shift in the surface plane of the pages being imaged and/or the gutter position typically does not cause a significant problem. However, for thicker books, the shift in the surface plane of the pages being imaged can be relatively large, causing the pages to become out of focus (as cameras have a finite depth of field), non-uniformly lit, and/or misaligned relative to the boundaries of the camera's image frame. In addition, if not compensated or otherwise addressed, the cameras must also provide for a sufficient large overscan area so as to ensure that the entire page of the first page as well as the shifted last page of the book are properly scanned.

The cradle positioning mechanism 40 provides a relatively simple method by which to move the cradle and the book and thus maintain the pages being imaged within the depth of field of the camera or to maintain the gutter at a relatively constant position relative to the cameras (or a compromise between the two). The cradle positioning mechanism 40 achieves very good results in approximating the pages within the depth of field of the camera. It is noted that although the cradle positioning mechanism 40 is shown and described herein as positioning a cradle with angled sides, the cradle positioning mechanism 40 may be used with any suitable cradle, such as a cradle without angled sides, i.e., a cradle that merely provides a flat surface or platform for supporting the book. With a flat cradle, the cradle positioning mechanism 40 is preferably employed to maintain the gutter of the book in approximately the same position relative to the cameras rather than adjusting for the shift in the image planes of the pages.

However, if the image capturing system 20 maintains each page being imaged at the center of the depth of field, the amount of overscan required to properly scan every page of the book is increased. To minimize the amount of overscan that is required, the image capturing system 20 may attempt to maintain the gutter of the open book 24 at a constant position relative to the cameras 22. As is evident, any desired compromise between the maintaining the image within the depth of field and maintaining the gutter at a constant position relative to the cameras may be determined and employed.

The focus and/or alignment issues and/or the minimum overscan areas resulting from the shift in the surface plane of the pages being imaged as well as the shift in the gutter of the book may be at least partially resolved by providing a cradle with a variable gutter width to better match and accommodate books of differing thickness and/or by providing a cradle with a variable position along a left-right horizontal axis 38. Moving the cradle along the left-right axis 38 helps to keep the gutter 28 to an approximately constant position relative to the cameras or helps to keep the page surface planes approximately aligned to an approximately constant position relative to the image plane of the cameras 22 as the pages of the book 24 are turned (or a compromise between the two). The concepts of alignment, depth of focus, and minimum overscan area are described in more detail with reference to FIGS. 2A-2I.

Figure 2A:
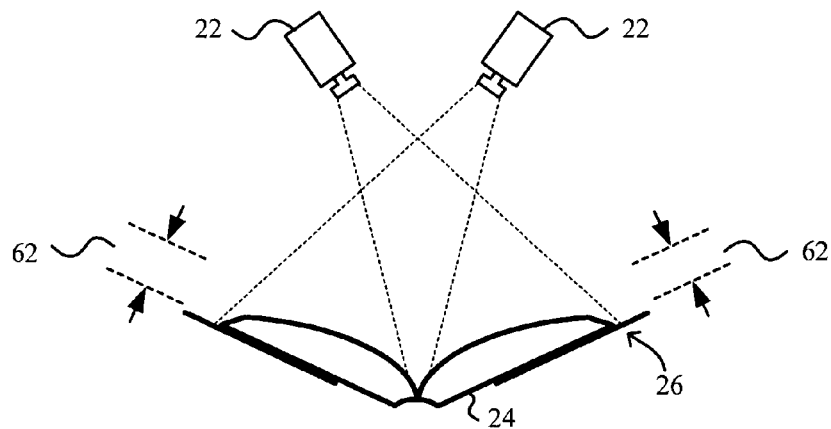
FIG. 2A is a schematic diagram illustrating the depth of field of the cameras.

FIG. 2A is a schematic diagram illustrating the depth of field 62 of the cameras 22. The exact position and size of the depth of field 62 may depend on the sensor, lens and aperture of the cameras 22 as well as the distance from the camera to the image object and the acceptable "circle of confusion" allowed on the sensor (or film). Preferably, the depth of field 62 ranges from 1" to 5". Ideally, each page being imaged is maintained at the center of the allowable depth of field for the best image sharpness.

Figure 2B:
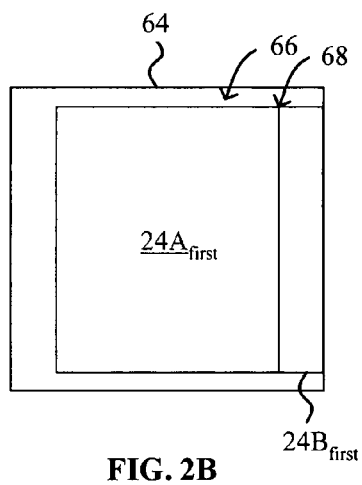
FIGS. 2B and 2C are schematic diagrams illustrating a first and a last left facing page within an image area of the camera, respectively, when the cradle is positioned to maintain the gutter of the book at an approximately constant position relative to the camera.
Figure 2C:
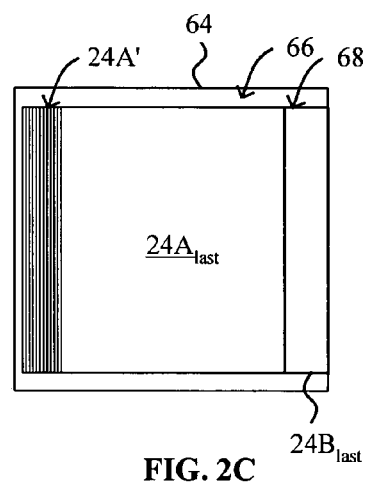

FIGS. 2B and 2C are schematic diagrams illustrating a first left facing page $24A_{first}$ and a last left facing page $24A_{last}$ of a book within an image area 64 of the camera 22, respectively, when the cradle 26 is positioned so as to maintain the gutter 68 of the book at an approximately constant position relative to the camera 22 and thus at an approximately constant position relative to the image area 64 of the camera 22. As shown in FIG. 2C, all the prior pages 24A' are now under the current and last left facing page $24A_{last}$. Yet, the first $24A_{first}$ and the last left facing pages $24A_{first}$, $24A_{last}$ as shown in FIGS. 2B and 2C are at approximately the same position within the image area 64. By maintaining the facing pages 24A, 24B at approximately constant positions relative to the image areas 64 of the camera 22, the required overscan area 66 can be minimized.

Figure 2F:
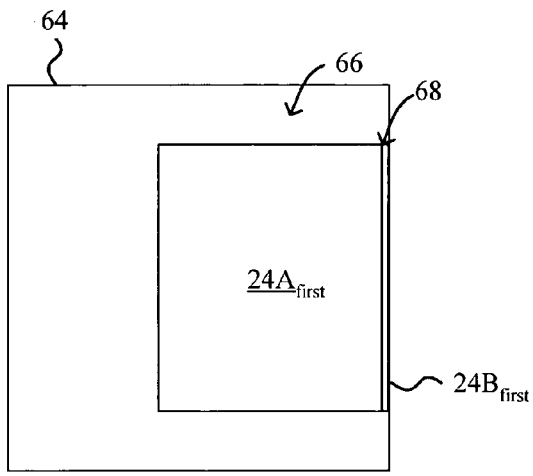
FIGS. 2F and 2G are schematic diagrams illustrating the first and last set of facing pages of a book, respectively, when the cradle is positioned to maintain the pages being imaged within the depth of field of the cameras.
Figure 2G:
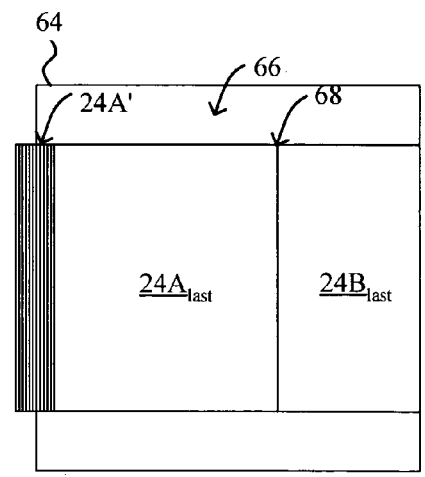
Figure 2D:
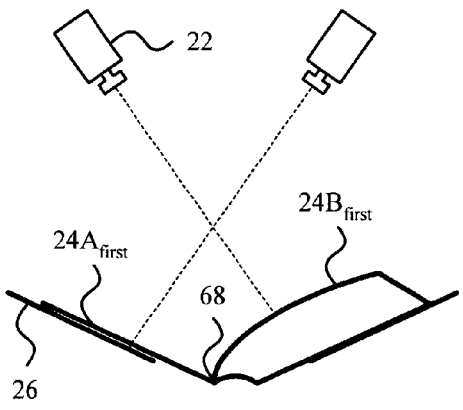
FIGS. 2D and 2E are schematic diagrams illustrating the first and last set of facing pages of a book, respectively, when the cradle is positioned so as to maintain the gutter of the book at an approximately constant position relative to the camera.
Figure 2E:
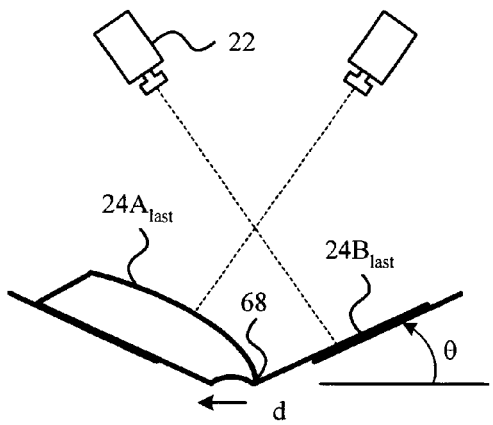

FIGS. 2D and 2E are schematic diagrams illustrating the first set of facing pages $24A_{first}$, $24B_{first}$ and a last set of facing pages $24A_{last}$, $24B_{last}$ of a book, respectively, when the cradle 26 is positioned so as to maintain the gutter 68 of the book at an approximately constant position relative to the camera 22. The cradle in FIG. 2E is shifted by a distance d where d is the thickness of the book, relative to the cradle shown in FIG. 2D. As a result, both sets of facing pages are generally centered relative to the image are of the cameras 22. However, the distance from the first left facing page $24A_{first}$ to the camera 22 is greater than the distance from the last left facing page $24A_{last}$ to the camera 22 by an amount approximately equal to $d*(1-\sin\theta)$ where $\theta$ is the angle between the cradle and a horizontal, i.e., a table, which can be, for example, 25°. Similarly, the distance from the first right facing page $24B_{first}$ to the camera 22 is less than the distance from the last left facing page $24B_{last}$ to the camera 22 by an amount approximately equal to $d*(1-\sin\theta)$. Where $\theta$ is 25°, $d*(1-\sin\theta)$ is approximately $0.58*d$.

FIGS. 2F and 2G are schematic diagrams illustrating the first set of facing pages and the last set of facing pages of a book, respectively, when the cradle 26 is positioned so as to maintain the surface planes of the pages being imaged at an approximately constant position relative to the camera 22, i.e., maintaining the pages being imaged at approximately the center of the depth of field of the camera 22. As a result, the first $24A_{first}$ and the last left facing pages $24A_{first}$, $24A_{last}$ as shown in FIGS. 2F and 2G are shifted in position relative to each other within the image area 64. By maintaining the facing pages 24A, 24B approximately within the depth of focus of the cameras 22, the required overscan area 66 is relatively large. In other words, because of the shift associated with maintaining the pages being imaged within the depth of field of the camera 22, the image areas 64 of the cameras 22 need to be relatively large as compared to the image sizes of the pages themselves.

Figure 2H:
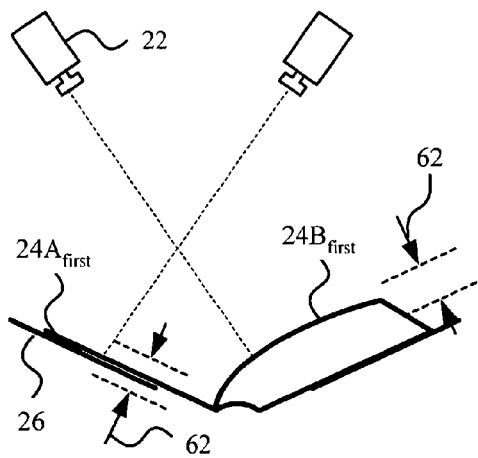
FIGS. 2H and 2I are schematic diagrams illustrating the first and last set of facing pages of a book, respectively, when the cradle is positioned to maintain the pages being imaged within the depth of field of the cameras.
Figure 2I:
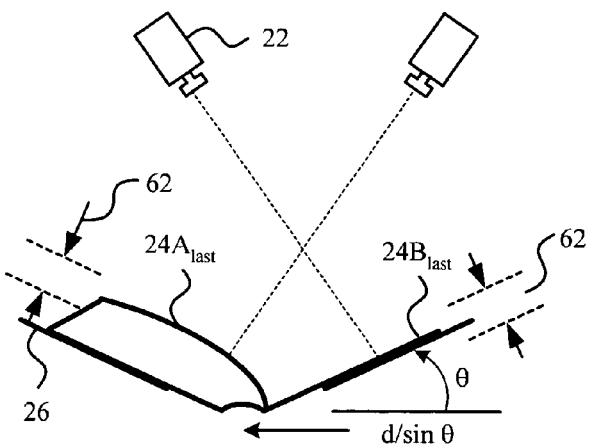

FIGS. 2H and 2I are schematic diagrams illustrating the first set of facing pages $24A_{first}$, $24B_{first}$ and a last set of facing pages $24A_{last}$, $24B_{last}$ of a book, respectively, when the cradle 26 is positioned so as to maintain the surface planes of the pages being imaged at an approximately constant position relative to the cameras 22, i.e., maintaining the pages being imaged within the depth of field of the cameras 22. In order to maintaining the pages being imaged within the depth of field of the cameras 22, the cradle 26 in FIG. 2I positioned for imaging the last pages of the book is shifted relative to the cradle 26 in FIG. 2H positioned for imaging the first pages of the book by a distance equal to $d/\sin\theta$. Where $\theta$ is 25°, $d/\sin\theta$ is $2.37*d$. As a result of the positioning of the cradle 26, the surface planes from the first to the final sets of facing pages are maintained at an approximately constant position relative to the cameras 22, i.e., maintained approximately centered within the depth of field of the cameras 22. This is illustrated by the depth of field 62 of the cameras 22 in FIGS. 2H and 2I. However, as discussed above, such maintenance within the depth of field requires a relatively large overscan area.

As noted above, a compromise may be made between the two cases discussed above, i.e., maintaining the gutter of the book or the page surfaces at a constant position relative to the cameras. For example, where $\theta$ is 25°, the cradle shifts d and $d/\sin\theta$ (or $2.37*d$ when $\theta$ is 25°) as the book is turned from the first to the last page in order to maintain the gutter or the page surfaces at a constant position relative to the cameras, respectively. As an example of a compromise, the cradle may shift anywhere between 1 and 2.37 times d.

As noted above, the focus and/or alignment issues caused by the shift in the surface plane of the pages being imaged can be at least partially resolved by providing a cradle with a variable position along a left-right direction 38. Moving the cradle along the left-right axis 38 helps keep the gutter 28 or the page surface planes approximately aligned to a constant position relative to the image planes of the cameras 22 as the pages of the book 24 are turned (or a combination of the gutter alignment and the image plane alignment). In other words, providing for positioning of the cradle along a horizontal direction allows the pages to be better maintained within a depth of field of the camera (image plane alignment) and/or the requires less overscan area (gutter alignment).

Thus the cradle positioning mechanism 40 may be employed to position the book 24 such that the gutter of the book (between the two facing pages) or the page surface planes are approximately aligned to a constant position as the pages of the book are turned. It is noted that although the cradle positioning mechanism 40 is shown and described herein as positioning a cradle with angled sides, the cradle positioning mechanism 40 may be used with any suitable cradle, such as a cradle without angled sides, i.e., a cradle that merely provides a flat surface or platform for supporting the book.

As noted above, the width of the gutter 28 is preferably adjustable in the direction as shown by arrow 38, i.e., along the width of the book 24 or perpendicular to the length of the binding of the book 24. Any suitable mechanism may be employed to provide the adjustability of the cradle 26. FIGS. 3A-3E are schematic diagrams illustrating various cradle width adjustment mechanisms that may be used in an image capturing system such as that shown in FIG. 1A. Each of the cradles 26 shown in FIGS. 3A-3E has two cradle portions, e.g., a cradle left portion and a cradle right portion. The two cradle portions are selectively positioned relative to each other so as to provide the desired gutter width.

In the example of FIGS. 3A and 3B, the cradle 26 is composed of two non-overlapping portions, preferably one stationary and one adjustable toward and away from the stationary portion as indicated by the arrows shown. Once the adjustable portion is positioned at a desired distance relative to the stationary portion in accordance with the thickness of the book, the adjustable portion may be held stationary relative to the stationary portion by any suitable fastener such as a clamp or a clip. As shown in the example of FIG. 3A, the cradle 26 need not provide a gutter on which the book 24 rests. Rather, the two portions of the cradle 26 form an opening therebetween into which the book can be positioned. The front and back covers of the book are preferably secured to the respective left and right portions of the cradle 26 such as with various clamps or other devices. As shown in FIG. 3B, the thicker the book 24, the more the two portions of the cradle 26 are separated in distance and the lower the book 24 or the spine of the book 24 rests below the portions of the cradle 26. In one embodiment, the gap between the two cradle portions is adjusted to book thickness/sin $\theta$ where $\theta$ is the angle between each portion of the cradle and a horizontal, i.e., the table, which can be, for example, 25°. Such a configuration allows the pages of the open book to remain in approximately the same distance from the cameras regardless of the thickness of the book when the adjustable width cradle is also used in conjunction with a cradle positioning mechanism, as will be described in more detail below. In other words, as successive books of varying thickness are scanned, the open pages remain approximately in focus without further focusing adjustments to the cameras.

In the example of FIG. 3C, the gutter of one of the cradle portions defines an opening into which the gutter of the other of the cradle portions fits. The width of the gutter 28 depends on how far the gutter of the right cradle portion is inserted into the opening of the gutter of the left cradle portion. In FIG. 3D, the gutter of the two cradle portions define mating teeth or any other mating geometric shape. The positions of the two cradle portions relative to each other determines the width of the gutter 28. In FIG. 3E, the gutter is provided by only one cradle portion while the other cradle portion is selectively positioned with respect to the gutter. For example, the gutter may define recesses while the other cradle portion may define mating protrusions that can be inserted into one of the recesses. With any of these examples, the gutters may be self-locking, such as by relying on forces exerted on the opposing angled supports of the cradle. The two cradle portions may also be secured to each other and/or to another structure using any suitable fastening mechanism such as clips and/or clamps.

Any suitable system may be utilized for the cradle positioning mechanism 40. For example, as shown in FIG. 1A, the cradle positioning mechanism 40 includes a servo motor 42, a shaft 44 extending from or otherwise in communication with the servo motor 42, and a bearing or track 46 for supporting and guiding the positioning or movement of the cradle 26 relative to a stationary object such as a table. The servo motor 42 extends and retracts the shaft 44 to push and pull the cradle 26 and the book 24 placed in the cradle 26 in the horizontal direction 38, supported and guided by the bearing 46. The servo motor 42 may drive the shaft 44 in any appropriate manner. For example, the servo motor 42 and the shaft 44 may form a worm drive in which the servo motor 42 rotates a wheel with teeth to drive a threaded shaft in which the threads mesh with the teeth of the servo motor wheel. The worm drive thus translates the rotational motion of the servo motor 42 to a translational motion of the shaft 44 and thus the cradle 26.

The servo motor 42 may be an alternating-current (AC) servo motor although any other suitable drive motors may be utilized to move and position the cradle 26, including, for example, a stepper motor, direct-current (DC) servo motor, and hydraulic servo motor. A stepper motor moves incrementally, i.e., it moves the cradle 26 a predetermined distance each time the stepper motor receives an electric pulse. The incremental distance may be, for example, ⅛". The bearing 46 may be, for example, a ball bearing track, a roller bearing, or a rack and pinion mechanism, and preferably reduces friction between the movable cradle 26 and the table to facilitate movement therebetween. In one preferred embodiment, a ball screw preferably with 2 to 10 mm/revolution or pitch, may be used. The stepper motor may operate at 400 steps per revolution or 0.005 mm per step of cradle travel.

A controller or processor may be utilized to control the cradle positioning mechanism 40 and to determine the displacement, rate, timing, and/or frequency of the positioning of the cradle 26. Preferably, the controller is configured so as to shift the cradle and the book positioned thereon such that the pages being imaged are generally maintained within the depth of field and within the image frame of the camera.

For example, the controller/processor can track and use the current page count as well as the width of the book binding (or the gutter width setting of the cradle) and the total number of pages of the book to determine the rate at which the cradle 26 is to be shifted horizontally. The operator may input the total number of pages of the book and optionally the width of the book binding (or the gutter width setting of the cradle 26). Alternatively, image capturing system 20 may automatically detect the gutter width setting of the cradle 26 such as with the use of sensors. As another example, one or both sides of the cradle 26 may be equipped with a scale so as to weigh the corresponding side of the book to determine the relative portions of the book on the two sides of the cradle. The cradle positioning mechanism 40 may position the cradle accordingly using the measured weight or weights.

The frequency at which the cradle positioning mechanism 40 repositions the cradle 26 as well as the amount of displacement each time the cradle 26 is repositioned may depend on, for example, the minimum or other desired distance that the cradle positioning mechanism 40 can displace the cradle 26 each time the mechanism 40 is actuated with the minimum input. For example, a typical book page thickness is 0.05 to 0.20 mm. For each page turn, the cradle on the average may be moved to the left by (page thickness/sin θ) where θ is the angle between each side of the cradle and the horizontal, i.e., the table, which can be, for example, 25°. As (1/sin θ) is approximately 2.37 when θ is 25°, the cradle is moved to the left by 2.37 times the page thickness for each page turn. However, the cradle is preferably moved each time the cradle needs to be displaced by a minimum distance, for example, 2 mm. Thus, for a book with a page thickness of 0.12 mm and a ball screw stepper motor that is 2 mm/revolution, the stepper motor would make one revolution every 7 page turns, i.e., 2 mm/(0.12 mm page thickness*2.37).

Even with the provision of the cradle positioning mechanism 40, the pages are unlikely to be perfectly aligned in the center of the image frame of the camera. Thus, the camera preferably has an image frame size that results in some overscan. As is evident, the overscan allows room for error when there is sloppy book positioning, for example.

The image capturing system 20 may additionally or alternatively use various sensors such as range sensors, e.g., 3D cameras, range finder, lasers, edge detectors, etc., to detect the position of the surfaces of the pages being imaged. Using such sensors enables the cradle positioning mechanism 40 to compensate not only for the inherent displacement resulting from the pages being turned but also for variations in manual clamping displacements, for example.

The controller/processor preferably controls the cradle positioning mechanism 40 so as to provide a compromise among image framing, focal distance to surface of the page being imaged, focal distance to the gutter, and compensation for variations in manual clamping displacements.

The image capturing system 20 may also provide various other features. For example, as shown in FIG. 2, the cradle is preferably tilted toward the operator for comfort, e.g., from 7° to 13° or more preferably approximately 10°, with the angles being ergonomically matched to the operator's wrists and arms. The table and chair heights are preferably adjustable. The cradle preferably supports a book at a book opening angle of approximately 100°-135° as a compromise between ergonomics and page flatness.

Figure 4:
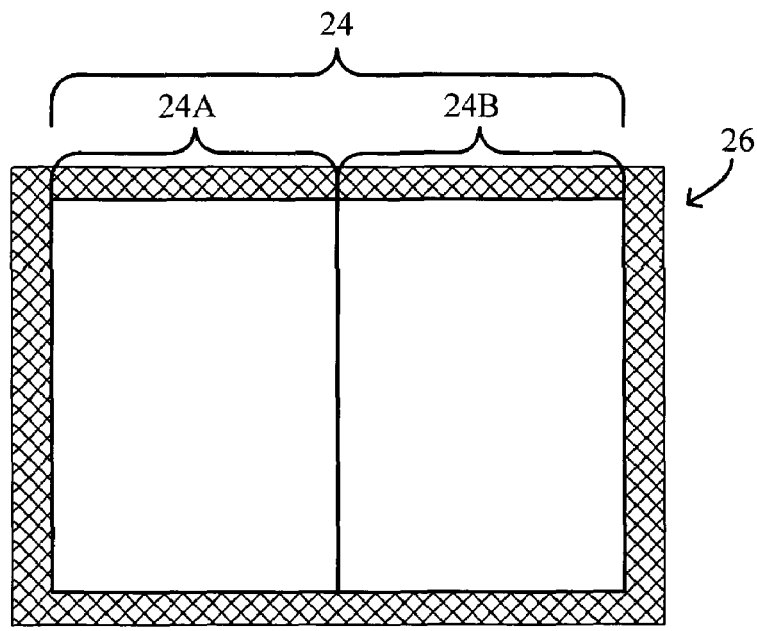
FIG. 4 is a schematic diagram illustrating pages of a book positioned in a cradle with a pattern thereon.

As yet another example, the surface of the cradle on which the book is placed preferably contains a pattern, as shown in the schematic of FIG. 4. In particular, by providing a pattern on the surface of the cradle, areas that are over-scanned by the camera can be readily discernable from the book during image processing. The pattern may also facilitate the centering of each page by the image capturing system software. The pattern is preferably specific, non-repeatable and with large features that are easy to recognize so as to facilitate detection and recognition. Furthermore, lights provided for illuminating the pages of the book are preferably arranged to cast a large amount of light on the pages while not generating glare into the cameras.

Figure 5:
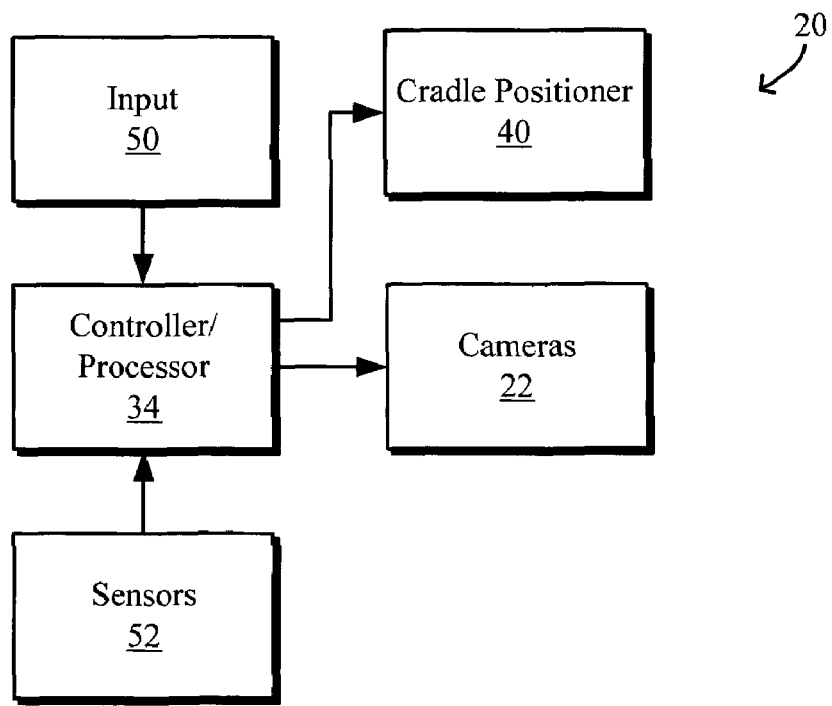
FIG. 5 is a block diagram of illustrating the interfaces among some of the components of the image capturing system of FIG. 1A.

FIG. 5 is a block diagram illustrating the interfaces among some of the components of the image capturing system of FIG. 1A. As shown, the image capturing system 20 includes the controller/processor 34 that communicates with and/or controls the cameras 22, the cradle positioning mechanism 40, optional operator input interface 50, and/or lights 48 for lighting the pages of the book. The operator input interface 50 allows the operator to input certain parameters, such as the total number of pages in the book, to facilitate the determination of the position of the cradle. The image capturing system 20 may also include various sensors 52 (e.g., scales, range sensors such as 3D cameras, range finder, lasers, and/or edge detectors) in communication with the controller/processor 34 to, for example, help the controller/processor 34 determine the displacement, speed, timing, and/or frequency of the 40 cradle positioning mechanism in positioning the cradle 26.

Figure 6:
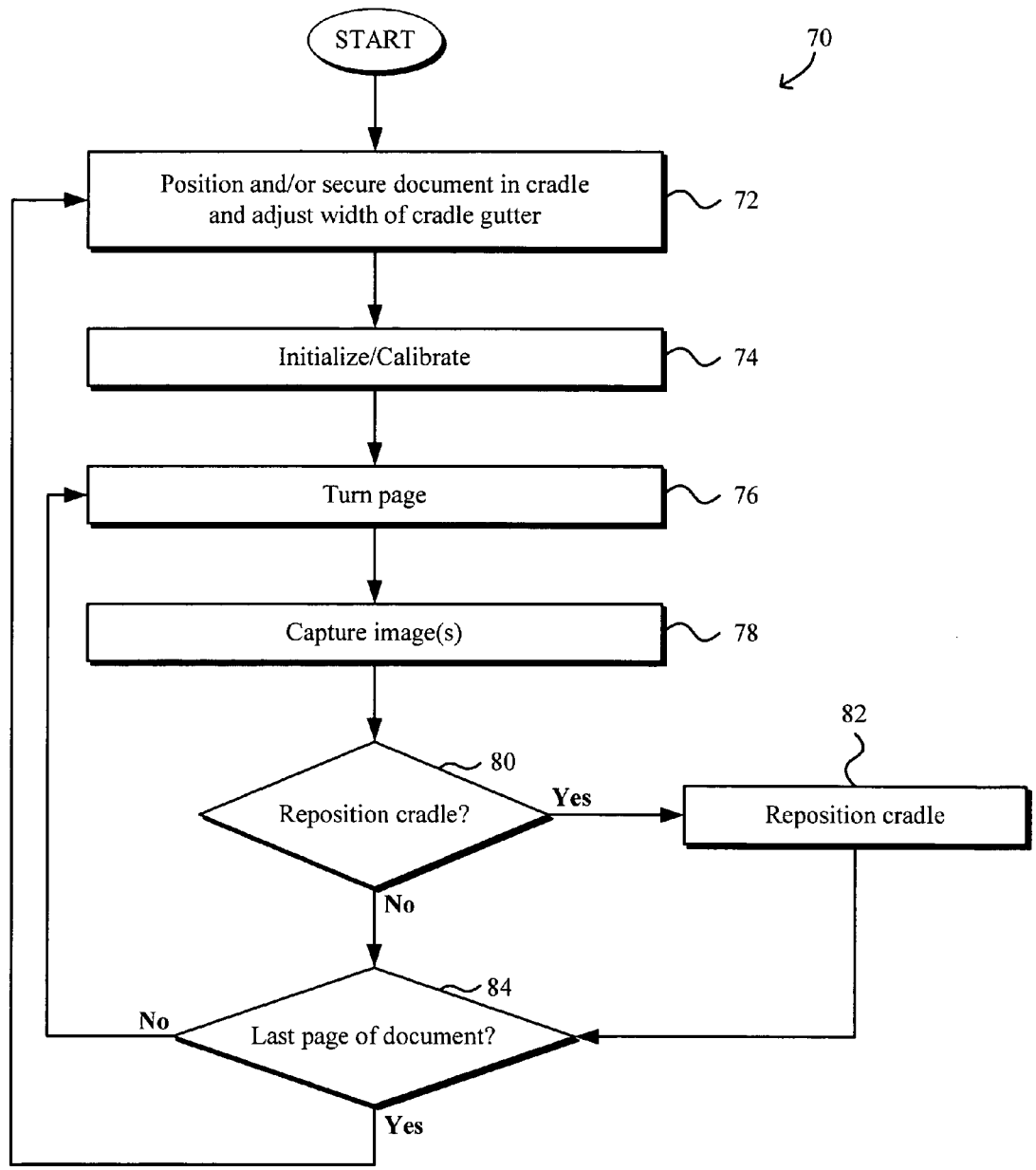
FIG. 6 is a flowchart illustrating a process for imaging pages of bound documents.

FIG. 6 is a flowchart illustrating a process for imaging pages of bound documents 70. In particular, at step 72, a bound document such as a book is placed in the cradle and the gutter width of the cradle is adjusted to better match the thickness of the book. The operator may also secure the book to the cradle using, for example, clips, clamps, and/or magnetic plate inserts inserted inside the front and/or back book covers. When magnetic plate inserts are used, the cradle is preferably configured such that the N/S poles are alternated to close the magnetic flux path to better secure the book to the cradle.

At step 74, the system captures or receives initial information to facilitate the cradle positioning mechanism in repositioning the cradle during the imaging process. For example, the operator may enter the total number of pages as input and/or sensors may obtain information relating to the book, e.g., edge locations, distribution of weight of the book on each side of the cradle, etc. As another example, the distance from the camera to the page is calibrated.

The imaging process begins with the turning of a page at step 76 and with the capture of the image(s) of the facing pages at step 78. Steps 76 and 78 may be performed automatically with the use of an automatic page turner and cameras that are automatically triggered. As another example, the operator may manually turn the page at step 76 and then trigger the cameras at step 78 such as by depressing a foot pedal. At step 80, the controller/processor determines whether any adjustment is to be made to the position of the cradle. Preferably, the controller/processor also determines the amount of any adjustment. If no adjustment to the position of the cradle is to be made, the process 70 proceeds to decision block 84 to determine if the last page of the document has been reached. Alternatively, if an adjustment is to be made, the process repositions the cradle at step 82 and continues the process 70 at decision block 84. If the last page of the document has not been reached, then the process 70 returns to step 76 to turn to the next page of the document. If the last page of the document has been reached, then the process 70 returns to step 72 and repeats for the next document.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. An imaging system for imaging a bound document, comprising:
    a camera that is stationary;
    a cradle having first and second sides for supporting the bound document, the first and second sides being fixed relative to one another throughout imaging of an entirety of the bound document;
    a cradle positioning mechanism coupled to the cradle and configured to selectively position the cradle and the bound document supported thereon along a directional axis relative to the camera; and a controller in communication with the cradle positioning mechanism for controlling the cradle positioning mechanism to drive the cradle and the bound document supported thereon a distance along the directional axis, the distance being based on an angle of at least one of the first and second sides relative to horizontal.

2. The imaging system of claim 1, wherein the controller controls the cradle positioning mechanism such that a gutter between two facing pages of the book remains in approximately a same location relative to the camera.

3. The imaging system of claim 1, wherein the controller controls the cradle positioning mechanism such that a surface plane of each page being imaged is approximately in a same position relative to the camera.

4. The imaging system of claim 1, wherein the controller controls the cradle positioning mechanism such that the positioning of the cradle is a compromise between maintaining a gutter between two facing pages of the book in approximately a same location relative to the camera and maintaining a surface plane of each page being imaged at approximately a same position relative to the camera.

5. The imaging system of claim 1, wherein the cradle positioning mechanism comprises a servo motor and a shaft controlled by the motor to position the cradle.

6. The imaging system of claim 1, further comprising a bearing for supporting the cradle and for guiding the positioning of the cradle.

7. The imaging system of claim 1, further comprising a sensor selected from the group consisting of 3D camera, range finder, laser, and edge detector to facilitate the controller in controlling the cradle positioning mechanism based on the location of the page being imaged relative to the camera.

8. The imaging system of claim 1, wherein the controller tracks a current page count and controls the cradle positioning mechanism based at least in part on the total number of pages of the document and the current page count.

9. The imaging system of claim 1, wherein the controller controls the cradle positioning mechanism based at least in part on one of a thickness of the document and a width of a gutter of the cradle.

10. The imaging system of claim 1, wherein the controller controls the cradle positioning mechanism based in part on a weight of the document exerted on a portion of the cradle.

11. The imaging system of claim 1, wherein the cradle has a pattern on a surface of the cradle facing the camera to facilitate discerning areas over-scanned by the camera.

12. The imaging system of claim 1, wherein the cradle comprises two angled sides for supporting each side of the bound document when the bound document is open, and a gutter between the two angled sides for supporting a center portion of the bound document, the gutter being adjustable in width.

13. The imaging system of claim 1, wherein the cradle comprises two portions moveable relative to each other to selectively adjust a width of the gutter.

14. The imaging system of claim 1, wherein the cradle supports the bound document when open such that the opening angle of the bound document is between approximately 100° and 135°.

15. The imaging system of claim 1, wherein the cradle holds the open bound document such that a center axis of the open bound document is tilted at an angle toward an operator.

16. The imaging system of claim 15, wherein the cradle is tilted toward the operator at an angle of approximately 7°-13° relative to a horizontal.

17. The imaging system of claim 1, further comprising a document securing mechanism for securing the document to the cradle, the document securing mechanism being selected from the group consisting of clip, clamp, magnetic plate for insertion inside a front cover of the document, and magnetic plate for insertion inside a back cover of the document.

18. The imagining system of claim 1, further comprising a magnetic plate for insertion inside at least one of a front and a back cover of the document, wherein the cradle is configured such that the magnetic plate is attracted to the cradle to facilitate securing document to the cradle.

19. An imaging system for imaging a bound document, comprising:
a camera that is stationary;
a cradle for supporting the bound document in an open position, the cradle including two angled sides for supporting each side of the bound document, the two sides being movable relative to each other so as to selectively adjust a distance therebetween to accommodate the bound document prior to imaging the bound document, and being fixed relative to one another throughout imaging of an entirety of the bound document; and
a cradle positioning mechanism coupled to the cradle and configured to drive the cradle and the bound document supported thereon a distance along a directional axis relative to a camera, the distance being based on an angle of at least one of the sides relative to horizontal.

20. An imaging system of claim 19, wherein the two angled sides of the cradle form an opening therebetween through which a center spine portion of the bound document is positioned.

21. A method for imaging a bound document having multiple pages, the method comprising the steps of:
fixing a camera in a stationary position;
supporting the bound document in a cradle;
fixing sides of the cradle relative to one another throughout imaging of an entirety of the bound document; and
driving the cradle a distance along a directional axis relative to a camera, the distance being based on an angle of the sides relative to horizontal using a cradle positioner that is coupled to the cradle and that is controlled by a controller.

22. The method of claim 21, wherein the positioning is such that a gutter between two facing pages of the book remains approximately in a same location relative to the camera.

23. The method of claim 21, wherein the positioning is such that a surface plane of each page being imaged is approximately in a same position relative to the camera.

24. The method of claim 21, wherein the positioning is a compromise between maintaining a gutter between two facing pages of the book in approximately a same location relative to the camera and maintaining a surface plane of each page being imaged at approximately a same position relative to the camera.

25. The method of claim 21, wherein the positioning includes driving a shaft with a servo motor.

26. The method of claim 21, wherein the cradle is supported by a bearing for guiding the positioning of the cradle.

27. The method of claim 21, further comprising the step of sensing a parameter of the document using a sensor selected from the group consisting of 3D camera, range finder, laser, and edge detector to facilitate the controller in controlling the cradle positioner based on the location of the page being imaged relative to the camera.

28. The method of claim 21, further comprising the step of tracking a current page count by the controller, wherein the positioning of the cradle is based at least in part on the total number of pages of the document and the current page count.

29. The method of claim 21, wherein the positioning of the cradle is based at least in part on one of a thickness of the document and a width of a gutter of the cradle.

30. The method of claim 21, wherein the positioning of the cradle is based at least in part on a weight of the document exerted on a portion of the cradle.

31. The method of claim 21, wherein the cradle has a pattern on a surface of the cradle facing the camera to facilitate discerning areas over-scanned by the camera.

32. The method of claim 21, further comprising the step of adjusting a width of a gutter of the cradle according to a thickness of the document, the cradle having two angled sides for supporting each side of the bound document when the bound document is open and a gutter between the two angled sides for supporting a center portion of the bound document.

33. The method of claim 21, further comprising the step of adjusting a width of a gutter of the cradle according to a thickness of the document, the cradle having two portions movable relative to each other to selectively adjust the width of the gutter.

34. The method of claim 21, wherein the cradle supports the bound document when open such that the opening angle of the bound document is between approximately 100° and 135°.

35. The method of claim 21, wherein the cradle holds the open bound document such that a center axis of the open bound document is titled at an angle toward an operator.

36. The method of claim 35, wherein the cradle is tilted toward the operator at an angle of approximately 7°-13° relative to a horizontal.

37. The method of claim 21, further comprising the step of securing the document to the cradle using a document securing mechanism selected from the group consisting of clip, clamp, magnetic plate for insertion inside a front cover of the document, and magnetic plate for insertion inside a back cover of the document.

38. The method of claim 21, further comprising the step of securing the document to the cradle using a magnetic plate for insertion inside at least one of a front and a back cover of the document, wherein the cradle is configured such that the magnetic plate is attracted to the cradle to facilitate securing the document to the cradle.

\* \* \* \* \*

UNITED STATES PATENT AND TRADEMARK OFFICE
CERTIFICATE OF CORRECTION

PATENT NO. : 7,639,406 B1 Page 1 of 1
APPLICATION NO. : 10/611408
DATED : December 29, 2009
INVENTOR(S) : R. Alexander Proudfoot, Christopher R. Uhlik and Joseph K. O'Sullivan It is certified that error appears in the above-identified patent and that said Letters Patent is hereby corrected as shown below:

Column 11, line 42, after "based" insert --at least--

Column 12, line 5, delete "imagining" and insert --imaging--

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,639,406 B1  Page 1 of 1
APPLICATION NO. : 10/611408
DATED : December 29, 2009
INVENTOR(S) : Proudfoot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1612 days.

Signed and Sealed this

Ninth Day of November, 2010

David J. Kappos
*Director of the United States Patent and Trademark Office*